(12) United States Patent
Kobayashi

(10) Patent No.: US 7,302,195 B2
(45) Date of Patent: Nov. 27, 2007

(54) IMAGE FORMING APPARATUS AND IMAGE PROCESSING SYSTEM

(75) Inventor: Takashi Kobayashi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 632 days.

(21) Appl. No.: 10/737,610

(22) Filed: Dec. 16, 2003

(65) Prior Publication Data

US 2004/0125399 A1    Jul. 1, 2004

(30) Foreign Application Priority Data

Dec. 17, 2002    (JP)    ............................. 2002-365198

(51) Int. Cl.
G03G 15/00    (2006.01)
(52) U.S. Cl. .......................................................... 399/8
(58) Field of Classification Search ............... 358/1.14; 399/8
See application file for complete search history.

(56) References Cited

FOREIGN PATENT DOCUMENTS

| JP | 407271538 A | * | 10/1995 |
| JP | 408142458 A | * | 6/1996 |
| JP | 08324071 A | * | 12/1996 |
| JP | 2006215686 A | * | 8/2006 |
| JP | 2006248149 A | * | 9/2006 |

* cited by examiner

Primary Examiner—David M. Gray
Assistant Examiner—Bryan Ready
(74) Attorney, Agent, or Firm—Akin Gump Strauss Hauer & Feld LLP

(57) ABSTRACT

An image forming system having a management information server and an image forming apparatus connected via a network. When the image forming apparatus enters a power saving mode and a power source is off, the apparatus is not reactivated by management information from the server but the power saving mode is maintained and the electric power consumption can be reduced. The system has: a communication control unit which receives print data and a management information obtaining command from the outside; a data discriminating unit which discriminates them and notifies the communication control unit of the discrimination result; an image forming unit which receives the print data and prints; and a power supply control unit which shuts off/recovers a part or all of the power sources to the image forming unit and notifies the communication control unit that the shut-off/recovery has been made.

9 Claims, 13 Drawing Sheets

Fig.5

```
* * * * * * * * * * * * * * * * * * * * * * * *
 @ PRINT DATA
* * * * * * * * * * * * * * * * * * *
* * * * * * * * * *
* * * * * * * * *
* * * * * * * *
* * * * * * *
* * * * * *
* * * * *
      :
      :
      :
      :
      :
```

IMAGE FORMING APPARATUS AND IMAGE PROCESSING SYSTEM

BACKGROUND OF THE INVENTION

1. Field of the Invention

The invention relates to an image forming apparatus and an image forming system.

2. Related Background Art

Hitherto, in an image forming apparatus such as a printer or the like, a power saving function to reduce electric power consumption has been installed in consideration of an environment or the like. According to the image forming apparatus having the power saving function, when a preset time passes, in a state where no operation is executed by the user or in a state where there is no reception data from an upper apparatus, a part or all of power sources in the image forming apparatus is shut off, thereby saving power. The image forming apparatus having the power saving function has: a power saving mode for shutting the power sources of a heater, a motor, a fan, and the like of a printing unit; and an operating mode such as a standby mode or the like for further shutting off the power sources except for those of parts of the circuits which are used for communication between an operation unit and the upper apparatus.

In an image forming system constructed by connecting image forming apparatuses such as printer, hybrid apparatus, and the like to a network, information managing means for transferring charge information, failure information, use situation information, and the like of the image forming apparatus to a server for an administrator via the network is provided. Thus, the system for managing a plurality of image forming apparatuses by the server for the administrator is constructed (for example, refer to JP-A-10-74132).

In this case, the information managing means is built in the image forming apparatus. In the image forming apparatuses such as printer, hybrid apparatus, and the like connected to the network, the information managing means is used in common by a control unit for receiving, analyzing, and developing information transmitted from the upper apparatus. The information managing means is means for transferring management information held in the image forming apparatus in accordance with collation which is made by the server for the administrator. The management information changes when the user uses the image forming apparatus by operating a personal computer or the like connected to the network. Therefore, in the image forming system in which the image forming apparatus and the server for the administrator are combined, the server for the administrator needs to collate the image forming apparatus at every predetermined interval of time in order to always hold the latest management information.

However, in the conventional image forming system, in spite of the fact that the power sources other than the partial circuit which is used for the communication between the operation unit of the image forming apparatus and the host are shut off when the operating mode of the image forming apparatus having the power saving function is shifted to the standby mode, each time the collation of the management information from the server for the administrator is received, the image forming apparatus is reactivated.

Generally, when the image forming apparatus enters the power saving mode and the operating mode is shifted to the standby mode, the management information does not change. Therefore, it is unnecessary to periodically collate the management information. In spite of such a fact, by collating the management information, the image forming apparatus is reactivated every collation, so that the electric power consumption cannot be sufficiently reduced.

SUMMARY OF THE INVENTION

It is an object of the invention to solve the problems of the conventional image forming system and to provide an image forming apparatus and an image forming system having a management information server and the image forming apparatus which are connected via a network, wherein when the image forming apparatus enters a power saving mode and a power source is shut off, the image forming apparatus is not reactivated by management information from the management information server but the power saving mode maintained and electric power consumption can be sufficiently reduced.

According to the invention, there is provided an image forming apparatus comprising:

a communication control unit which receives print data and a management information obtaining command from an outside;

a data discriminating unit which discriminates the print data and the management information obtaining command received by the communication control unit and notifies the communication control unit of a result of the discrimination;

an image forming unit which receives the print data from the communication control unit and prints on the basis of the print data; and a power supply control unit which shuts off/recovers a part or all of power sources which are supplied to the image forming unit and transmits a notification showing that the shut-off/recovery has been made to the communication control unit, wherein when the communication control unit receives a notification showing that the data discriminating unit has determined that the received information is the management information obtaining command, if a part or all of the power sources which are supplied to the image forming unit have been shut off, the communication control unit maintains the shut-off state of the power supply control unit.

In the image forming apparatus, when the communication control unit receives the notification showing that the data discriminating unit has determined that the received information is the management information obtaining command, if a part or all of the power sources which are supplied to the image forming unit have been shut off, the communication control unit does not return a response to the management information obtaining command.

Further, according to the invention, there is also provided an image forming system having:

an image forming apparatus; and a management information server which obtains management information showing a state of the image forming apparatus by a management information obtaining command to the image forming apparatus, wherein the image forming apparatus comprises:

a communication control unit which receives print data and the management information obtaining command from an outside;

a data discriminating unit which discriminates the print data and the management information obtaining command received by the communication control unit and notifies the communication control unit of a result of the discrimination;

an image forming unit which receives the print data from the communication control unit and prints on the basis of the received print data; and a power supply control unit which shuts off/recovers a part or all of power sources which are supplied to the image forming unit and transmits a notification showing that the shut-off/recovery has been made to the communication control unit, wherein, when the communication control unit receives the notification showing that a part or all of the power sources which are supplied from the power supply control unit to the image forming unit have been shut off or recovered, the communication control unit transmits contents of the notification to the management information server, and the management information server controls the transmission of the management information obtaining command to the image forming apparatus when the server receives the notification showing that a part or all of the power sources which are supplied to the image forming unit of the image forming apparatus have been shut off, and restarts the transmission of the management information obtaining command to the image forming apparatus when the server receives the notification showing that a part or all of the power sources which are supplied to the image forming unit have been recovered.

In the image forming system, the management information server does not transmit a new management information obtaining command to the image forming apparatus when the server receives the notification showing that a part or all of the power sources which are supplied to the image forming unit of the image forming apparatus have been shut off, and restarts the transmission of the management information obtaining command to the image forming apparatus when the server receives the notification showing that a part or all of the power sources which are supplied to the image forming unit have been recovered.

Further, in the image forming system, the management information server reduces a transmission/reception frequency of a new management information obtaining command to the image forming apparatus when the server receives the notification showing that a part or all of the power sources which are supplied to the image forming unit of the image forming apparatus have been shut off, and increases the transmission/reception frequency of the management information obtaining command to the image forming apparatus when the server receives the notification showing that a part or all of the power sources which are supplied to the image forming unit have been recovered.

The above and other objects and features of the present invention will become apparent from the following detailed description and the appended claims with reference to the accompanying drawings.

BRIEF DESCRIPTION OF THE DRAWINGS

FIG. 5 is a diagram showing an example of print data in the first embodiment of the invention;

FIG. 6 is a diagram showing an example of an inquiry of management information in the first embodiment of the invention;

DETAILED DESCRIPTION OF THE PREFERRED EMBODIMENTS

Embodiments of the invention will be described in detail hereinbelow with reference to the drawings.

Figure 1:
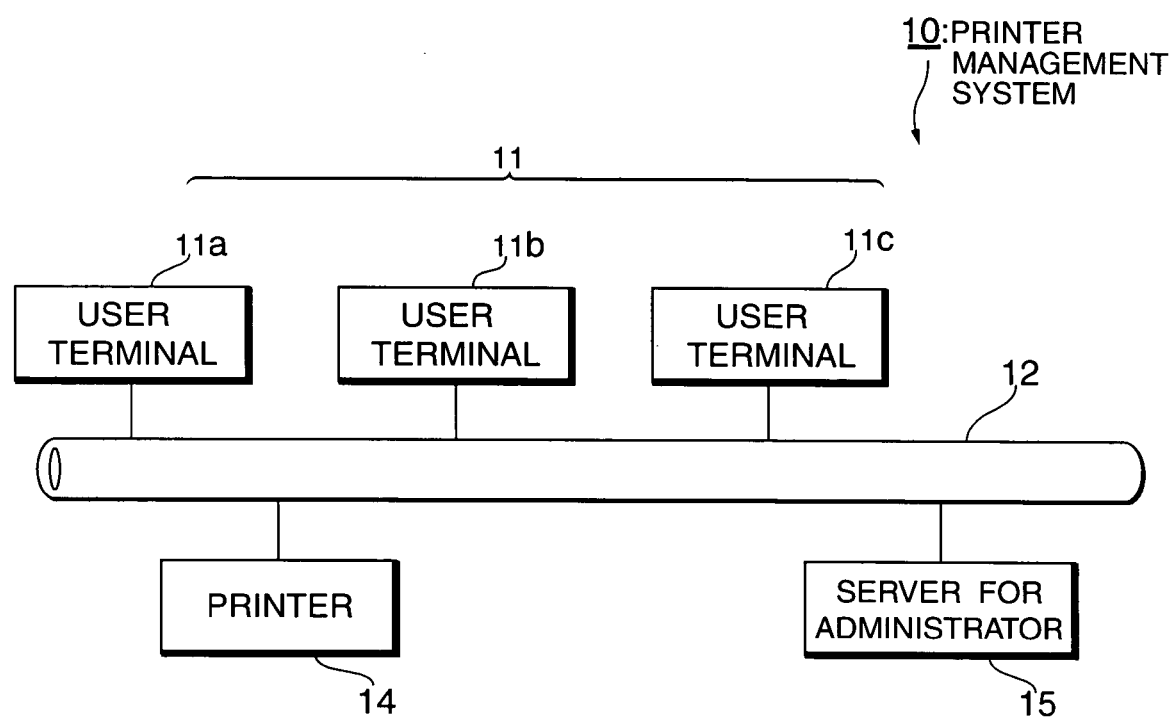
FIG. 1 is a diagram showing a construction of a printer management system according to the first embodiment of the invention.
Figure 2:
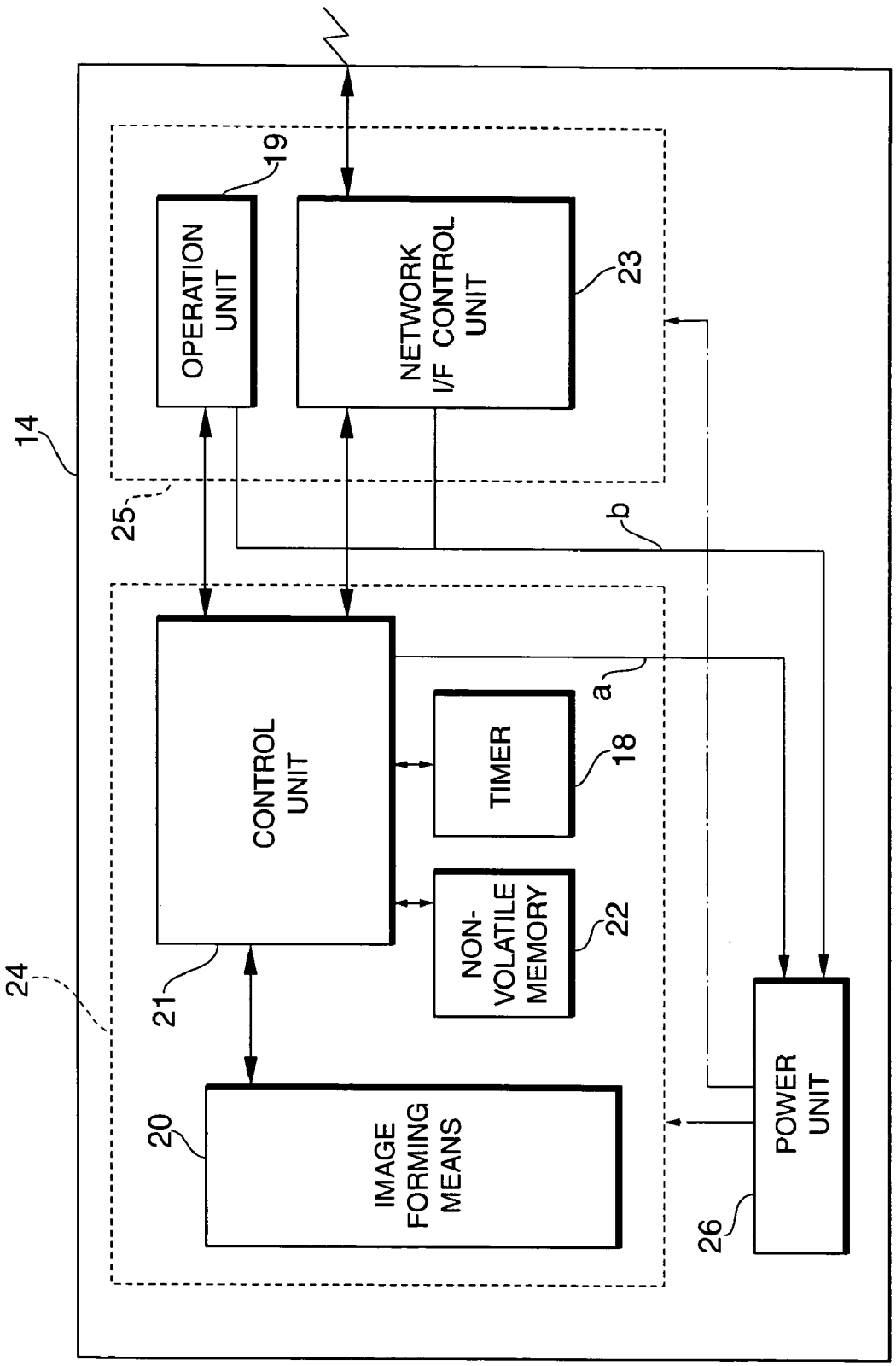
FIG. 2 is a diagram showing a construction of a printer in the first embodiment of the invention.
Figure 3:
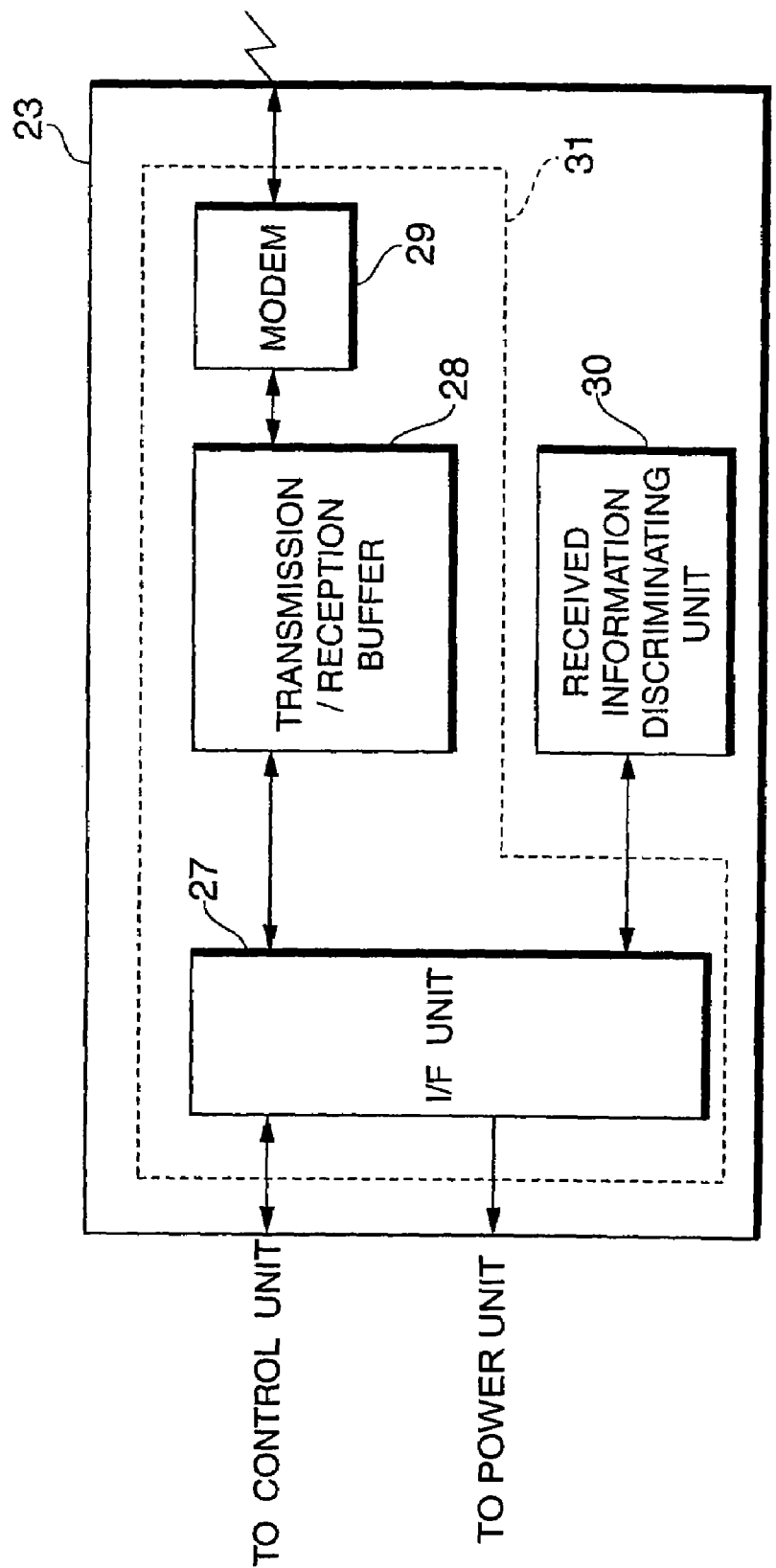
FIG. 3 is a diagram showing a construction of a network interface (I/F) control unit in the first embodiment of the invention.

FIG. 1 is a diagram showing a construction of a printer management system according to the first embodiment of the invention. FIG. 2 is a diagram showing a construction of a printer in the first embodiment of the invention. FIG. 3 is a diagram showing a construction of a network interface control unit in the first embodiment of the invention.

In FIG. 1, reference numeral 10 denotes a printer management system serving as an image forming system. The printer management system 10 has: user terminals 11a, 11b, and 11c which are operated by the user; a printer 14 serving as an image forming apparatus; a server 15 for an administrator serving as a management information server which is operated by the administrator; and a network 12 to which the user terminals 11a, 11b, and 11c, the printer 14, and the server 15 for the administrator are connected.

Each of the user terminals 11a, 11b, and 11c is a computer comprising: arithmetic operating means such as CPU, MPU, or the like; storing means such as magnetic disk, semiconductor memory, or the like; display means such as CRT, liquid crystal display, or the like; input means such as a keyboard or the like; a communication interface; and the like. For example, each user terminal is a personal computer, a server, a workstation, or the like; however, any similar apparatus can be used. Each of the user terminals 11a to 11c functions as an upper apparatus of the printer 14 and transmits print data to the printer 14. In the case of integratedly explaining the user terminals 11a to 11c, they will be described as user terminals 11. Although FIG. 1 shows an example where three user terminals 11a, 11b, and 11c are used as user terminals 11 connected to the network 12, the number of user terminals 11 is not limited to 3 but can be set to an arbitrary number.

The network 12 is a wire or wireless communication circuit network and is, for example, a LAN (Local Area Network), a WAN (Wide Area Network), Intranet, Internet, or the like. However, it can be any kind of communication circuit network or can be also constructed by a plurality of communication circuit networks.

The server 15 for the administrator is a computer comprising: arithmetic operating means such as CPU, MPU, or the like; storing means such as magnetic disk, semiconductor memory, or the like; display means such as CRT, liquid crystal display, or the like; input means such as a keyboard or the like; a communication interface; and the like. For example, the administrator server 15 is a server, a workstation, main frame computer, or the like; however, any kind of similar apparatus can be used.

Further, the printer 14 can be any kind of printer such as ink jet type printer, electrophotographic type printer, thermal transfer type printer, or the like. However, the embodiments will be explained on the assumption that the printer 14 is the electrophotographic type printer.

As shown in FIG. 2, the printer 14 has: a power shut-off area under power saving 24 where a power source is shut off when the power-saving function is made operative; and a normally-open current supplying area 25 where the power source is not shut off even when the power-saving function is made operative. Image forming means 20 as an image forming unit, a control unit 21 which functions as a power supply control unit, a non-volatile memory 22, and a timer 18 exist in the power shut-off area under power saving 24. The image forming means 20 has a photosensitive drum (not shown) serving as an image holding member, a print head (LED (Light Emitting Diode) head) serving as exposing means, a fixing unit, a copy transfer unit, and the like and prints onto a print sheet by an electrophotographic process. The control unit 21 has arithmetic operating means such as CPU, MPU, or the like and storing means such as ROM, RAM, or the like and executes interpretation and an image developing process of the print data. The control unit 21 is connected to the image forming means 20 via a bus and controls the operation of the image forming means 20 so as to execute the printing. The control unit 21 further controls the operation of a power unit 26, which will be explained hereinlater, so as to shut off the power source.

The non-volatile memory 22 is connected to the control unit 21 via a bus and stores management information of the printer 14 including a kind and a size of the sheet used for the printing and a print result such as the number of print copies or the like. The timer 18 is connected to the control unit 21 via a serial bus and transmits a signal to the control unit 21 when a predetermined time passes.

An operation unit 19 and a network interface control unit 23 serving as a communication control unit exists in the normally-open current supplying area 25. The operation unit 19 has a display unit comprising a plurality of keys, an LCD (Liquid Crystal display), and the like, is connected to the control unit 21 via the serial bus, and displays a status of the printer 14. The operation unit 19 is used to change the contents of the information stored in the non-volatile memory 22 by operating the keys. The network I/F control unit 23 is connected to the control unit 21 via a bidirectional bus and connected to the network 12.

The power unit 26 is connected to the power shut-off area under power saving 24 and the normally-open current supplying area 25 via power lines and supplies electric power thereto, respectively. Even when a current is supplied, the power source of the power shut-off area under power saving 24 can be shut off in accordance with a power-saving operating command (a) sent from the control unit 21. The power unit 26 supplies the current to the power shut-off area under power saving 24 in accordance with a power-saving operation cancelling command (b) sent from the network I/F control unit 23 or the operation unit 19.

In the embodiment, the network I/F control unit 23 has a construction as shown in FIG. 3. In FIG. 3, reference numeral 27 denotes an interface unit. The I/F unit 27 is connected to the control unit 21 via a bus and also connected to the power unit 26. The I/F unit 27 has therein an interruption register (not shown) or the like and makes a setting of the interruption register during the power saving in accordance with an instruction from the control unit 21.

Reference numeral 31 denotes communicating means comprising a transmission/reception buffer 28 and modulator and demodulator (hereinbelow, abbreviated to MODEM) 29. The transmission/reception buffer 28 is connected to the I/F unit 27 via a plurality of buses. The MODEM 29 is connected to the transmission/reception buffer 28 and a signal modulated by the MODEM 29 is transmitted to the network 12. The signal received from the network 12 is demodulated by the MODEM 29 and transmitted to the transmission/reception buffer 28.

Reference numeral 30 denotes a received information discriminating unit serving as a data discriminating unit. The received information discriminating unit 30 is connected to the I/F unit 27 via a bidirectional bus, writes discriminating conditions, and when the discriminating conditions are satisfied, notifies the I/F unit 27 by a signal that they are satisfied.

Subsequently, the operation of the printer management system 10 will be described. First, the operation in the normal current supplying mode will be described.

Figure 4:
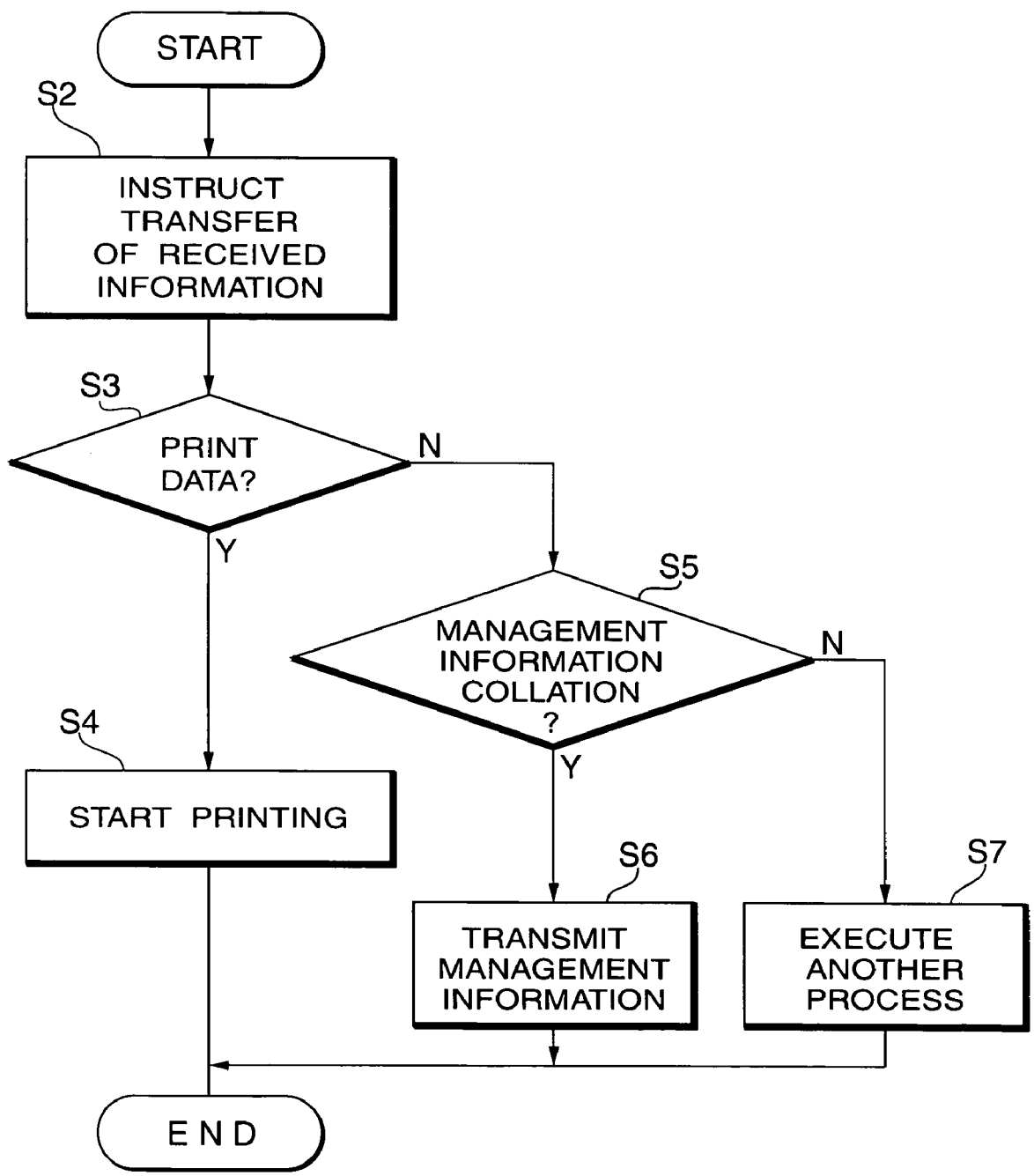
FIG. 4 is a flowchart showing the operation of the printer in a normal current supplying mode in the first embodiment of the invention.

FIG. 4 is a flowchart showing the operation of the printer in the normal current supplying mode in the first embodiment of the invention.

First, the print data is transmitted to the printer 14 from the user terminal 11 via the network 12. The print data transmitted to the printer 14 is transmitted to the control unit 21 via the network I/F control unit 23, interpreted by the control unit 21, and developed into image information. Subsequently, the control unit 21 controls the operation of the image forming means 20 on the basis of the developed image information so as to print onto the print sheet. The control unit 21 stores the management information such as the number of print sheets consumed for the printing, kind of sheet, amount of toner used, and the like into the non-volatile memory 22.

In the case of collating the management information, an inquiry request to collate the management information is transmitted to the printer 14 from the administrator server 15 via the network 12. The inquiry request transmitted to the printer 14 is sent to the control unit 21 via the network I/F control unit 23. Subsequently, the control unit 21 reads out the management information stored in the non-volatile memory 22 in response to the inquiry request and transmits it to the network I/F control unit 23. The network I/F control unit 23 returns the management information to the administrator server 15 via the network 12. The collation of the management information is periodically made.

The operation of the printer 14 in the normal current supplying mode will now be explained in detail with reference to the flowchart of FIG. 4.

The control unit 21 starts processes of the flowchart shown in FIG. 4 if there is information received from the network I/F control unit 23.

Step S2: The control unit 21 instructs the network I/F control unit 23 to transfer the received information.

Step S3: The control unit 21 discriminates whether the received information is the print data or not. If it is the print data, the processing routine advances to step S4. If it is not the print data, step S5 follows.

Step S4: The control unit 21 executes the interpretation and image developing processes of the print data and controls the image forming means 20 so as to execute the printing. The management information (the kind and size of the print sheet used for the printing, the number of print copies, and the like) as a print result is stored into the non-volatile memory 22.

Step S5: The control unit 21 discriminates whether the received information is the collation of the management information or not. If it is the collation of the management information, step S6 follows. If it is not the collation of the management information, step S7 follows.

Step S6: The control unit 21 transmits the management information stored in the non-volatile memory 22 to the administrator server 15.

Step S7: The control unit 21 executes another designated process, for example, a process for inquiring about status information or the like. In this manner, the processes of the received information are finished.

The operation in the power saving mode will now be described.

Figures 5, 6:
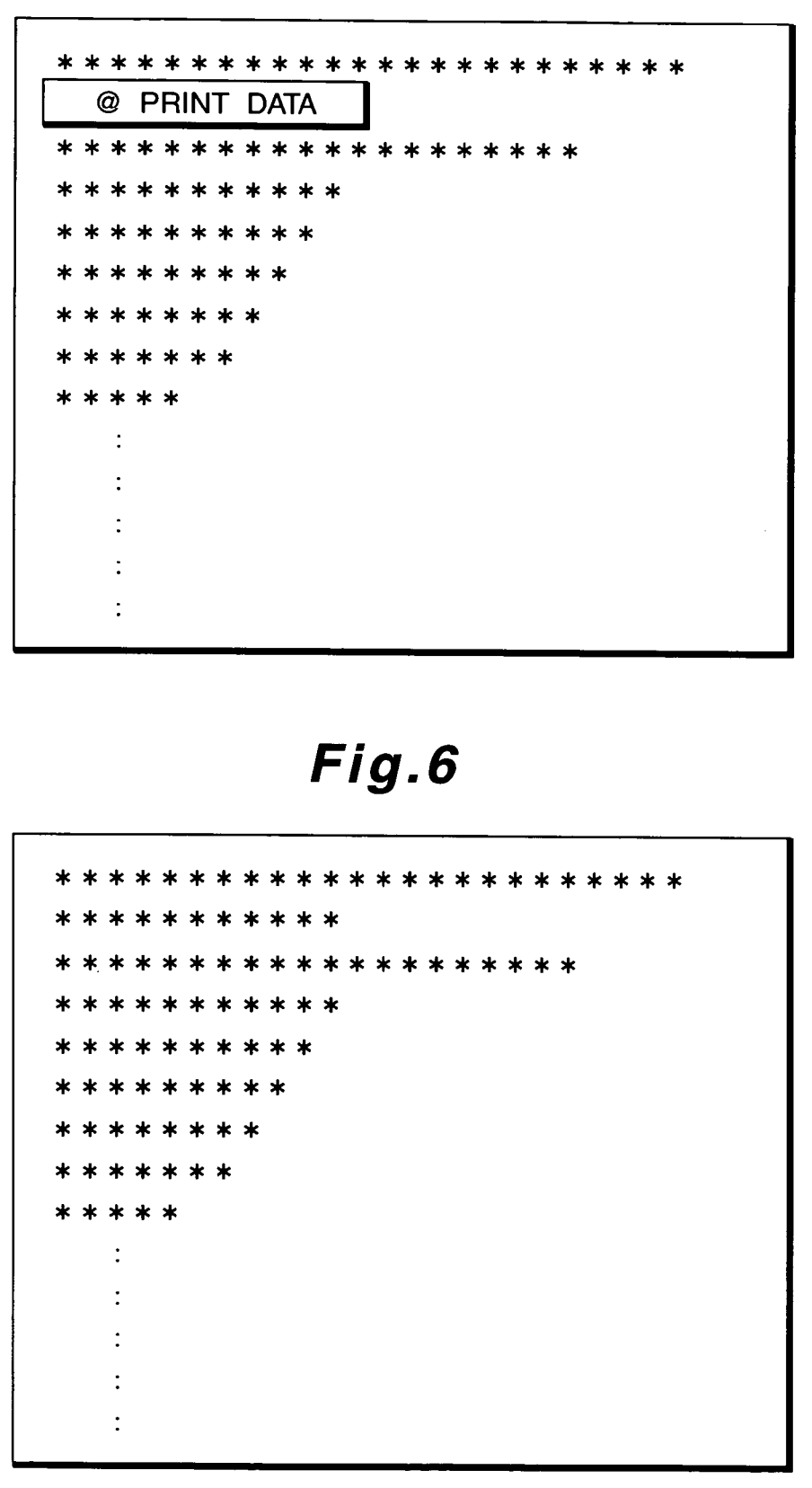
Figure 7:
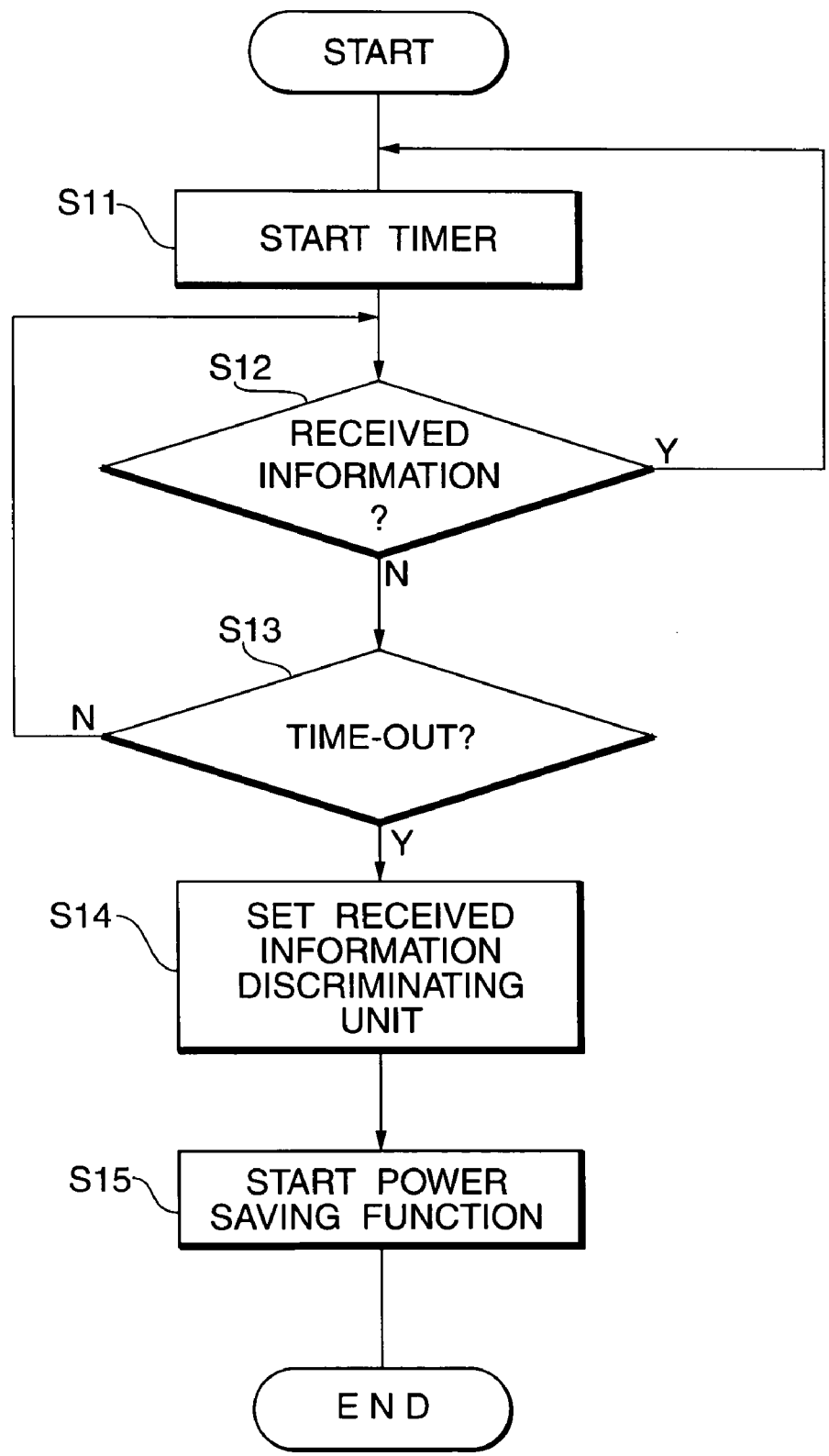
FIG. 7 is a flowchart showing the operation of the printer in a power saving mode in the first embodiment of the invention.
Figure 10:
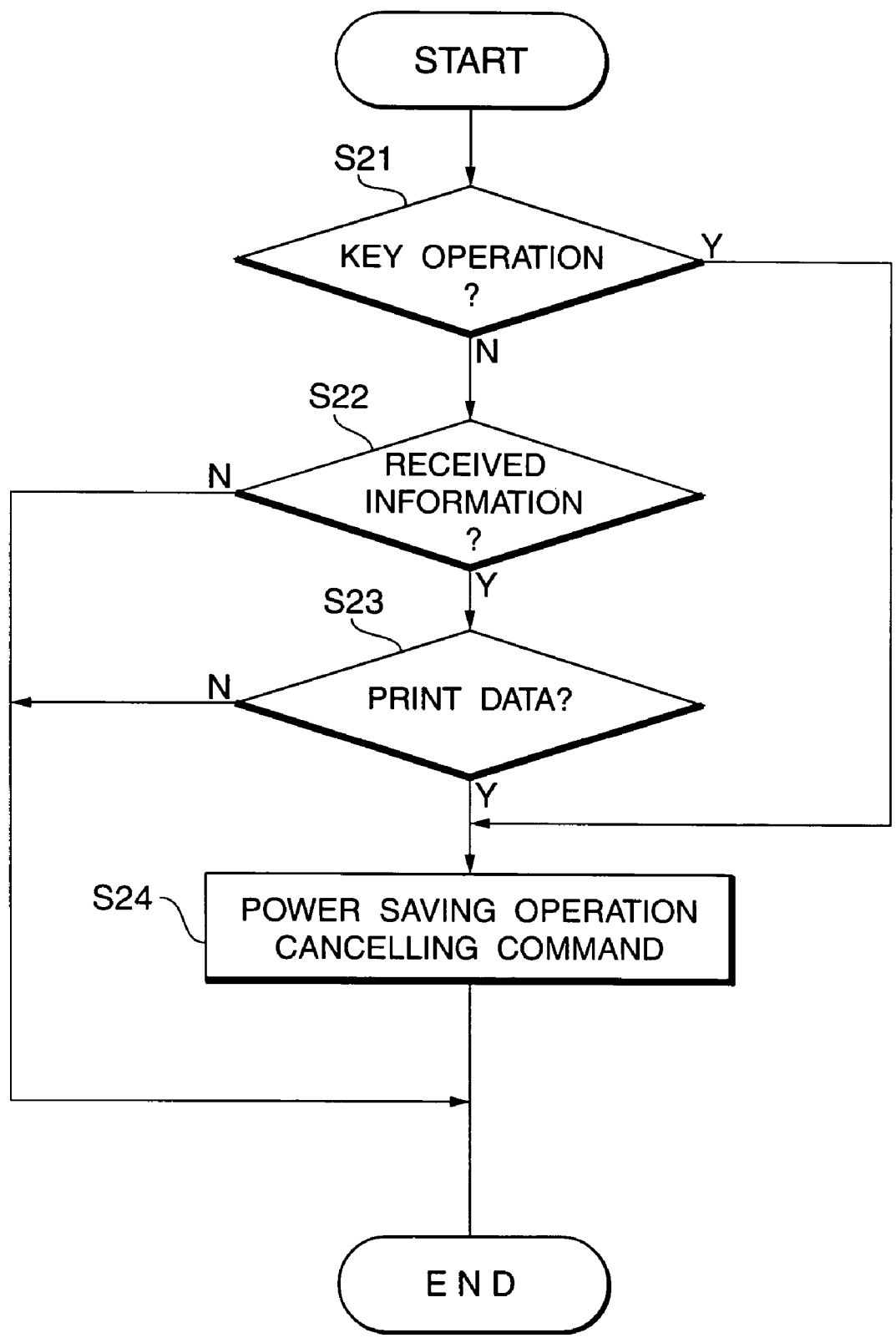
FIG. 10 is a flowchart showing the operation for cancelling a power saving function of the printer in the first embodiment of the invention.

FIG. 5 is a diagram showing an example of the print data in the first embodiment of the invention. FIG. 6 is a diagram showing an example of the inquiry of the management information in the first embodiment of the invention. FIG. 7 is a flowchart showing the operation for shifting to the power saving mode of the printer in the first embodiment of the invention. FIG. 10 is a flowchart showing the operation for shifting from the power saving mode of the printer to the normal current supplying mode.

In this case, first, a main switch of the printer 14 is turned on and when a predetermined time passes in a state where power sources are supplied from the power unit 26 to the power shut-off area under power saving 24 and the normally-open current supplying area 25, a signal is sent from the timer 18 to the control unit 21. In response to this signal, the control unit 21 generates the power saving operating command to the power unit 26 so as to enter the power saving mode. Thus, the power unit 26 shuts off the power source of the power shut-off area under power saving 24 and the printer 14 enters the power saving mode.

In the case of reactivating the printer 14, when the printer 14 receives the print data from the user terminal 11 via the network 12, the received information discriminating unit 30 in the network I/F control unit 23 discriminates the received information. If the received information is the print data as shown in FIG. 5, the control unit 21 sends the power-saving operation cancelling command to the power unit 26. In this case, a pattern for characterizing the print data such as "@PRINT DATA" is written into the print data. Thus, the power unit 26 supplies the power source of the power shut-off area under power saving 24 and the printer 14 enters the normal operating mode. Similarly, the printer 14 also enters the normal operating mode by the key operation from the operation unit 19.

If the received information is the inquiry about the management information serving as a management information obtaining command as shown in FIG. 6, the power unit 26 maintains the power shut-off area under power saving 24 in the power shut-off mode. In this case, the pattern for characterizing the print data is not written in the inquiry about the management information.

A procedure for the operation to shift from the normal standby mode to the power saving mode will now be described in detail with reference to the flowchart shown in FIG. 7. The operation of the printer 14 is started at a point of time when the main switch is turned on.

Step S11: The control unit 21 starts the timer 18.

Step S12: The control unit 21 discriminates the presence or absence of the received information. If the received information exists, the processing routine is returned to step S11. If there is no received information, step S13 follows.

Step S13: The control unit 21 discriminates whether a time-out has occurred or not, that is, whether a count value of the timer 18 exceeds a preset value or not. If it exceeds the preset value, step S14 follows. If it does not exceed the preset value, the processing routine is returned to step S12.

Step S14: Since it is determined that the time-out has occurred, the control unit 21 writes a pattern for discriminating the print data into the received information discriminating unit 30. Such a pattern is the pattern for characterizing the identification (ID) information of the printer 14 and the print data such as "@PRINT DATA". If the received information discriminating unit 30 recognizes the print data, the control unit 21 sets the register built in the I/F unit 27 so as to generate the power-saving operation cancelling command.

Step S15: The control unit 21 issues an instruction to the power unit 26 so as to shut off the power source of the power shut-off area under power saving 24. After that, the control unit 21 stops the operation, the printer is shifted to the power saving mode, and the processing routine is finished.

The operation to cancel the power saving function will now be explained.

Figure 8:
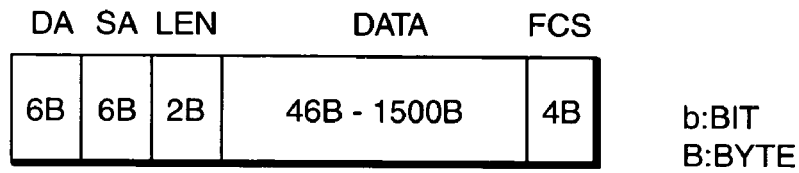
FIG. 8 is a diagram showing an example of packet information which is received by a received information discriminating unit in the first embodiment of the invention.
Figure 9:
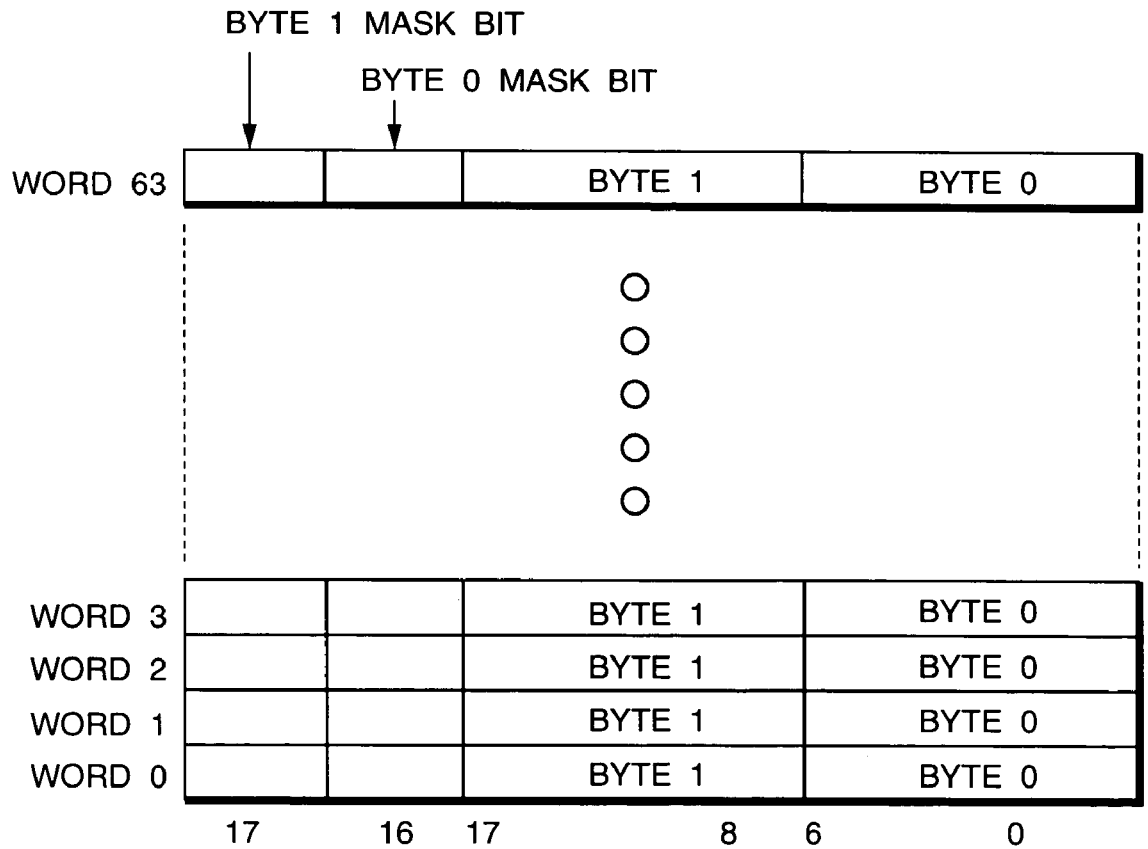
FIG. 9 is a diagram showing an example of a register for discrimination built in the received information discriminating unit in the first embodiment of the invention.

FIG. 8 is a diagram showing an example of packet information which is received by the received information discriminating unit in the first embodiment of the invention. FIG. 9 is a diagram showing an example of the register for discrimination built in the received information discriminating unit in the first embodiment of the invention. FIG. 10 is a flowchart showing the operation for cancelling the power saving function of the printer in the first embodiment of the invention.

The operation of the printer 14 in the case of cancelling the power saving function will be described in detail with reference to the flowchart of FIG. 10.

Step S21: The operation unit 19 discriminates whether there is a key operation or not. If there is the key operation, step S24 follows and the power-saving operation cancelling command is generated.

Step S22: The received information discriminating unit 30 discriminates the presence or absence of the received information. If there is the received information, step S23 follows. If there is no received information, the processing routine is finished.

Step S23: The received information discriminating unit 30 discriminates whether the received information is the print data or not. In this case, the discrimination is made by comparing the values held in the discriminating register shown in FIG. 9 with the packet shown in FIG. 8. That is, the information for characterizing the information to identify the printer 14 and the print data has been written into the discriminating register. If the same pattern is included in the packet, it is determined that the received information is the print data. If the same pattern is not included in the packet, it is determined that the received information is a collating command of the management information. In the packet, DA indicates a transmission destination address; SA a sender address; LEN a length of data; Data data which is actually transferred; and FCS a frame search sequence using a CRC. One discriminating register has a capacity of 64 bytes+28 bits (bits for masking). The received information discriminating unit 30 has a few registers therein and a plurality of power-saving operation cancelling conditions can be set. In the case of the print data, step S24 follows. If the received information is not the print data, the processing routine is finished.

Step S24: The received information discriminating unit 30 generates the power-saving operation cancelling command and the processing routine is finished.

Thus, the received information discriminating unit 30 can discriminate whether the received information is the command for collating the management information of the print data or not.

For example, assuming that in the printer 14 whose standby electric power in the normal current supplying mode is equal to 15 [W] and whose standby electric power in the power saving mode is equal to 1 [W], a sleep timer is set to 30 minutes and an inquiring interval of the administrator server 15 is equal to 1 hour, it is considered that the electric power consumption for the half of 1 hour is equal to 15 [W] and that for the residual half is equal to 1 [W]. In this case, in the conventional printer management system, the electric power consumption is equal to 8 [Wh]. On the other hand, in the printer management system 10 in the embodiment, it is considered that the electric power consumption for one hour can be suppressed to 1 [W]. In this case, an amount of the electric power consumption is equal to 1 [Wh].

As described above, in the embodiment, the power saving mode can be held without returning a response to the inquiry about the management information in the power saving mode and it is possible to make a response to the inquiry about the management information in the mode other than the power saving mode. Therefore, a wasteful operation such that the management information which is not changed because the printer is in the power saving mode is periodically referred to can be omitted. The amount of the electric power consumption when the printer 14 is in the standby mode can be suppressed.

If the printer does not respond to the inquiry about the management information, the administrator server determines that there is no change in status of the printer, so that nothing is executed in particular.

When the printer 14 is recovered from the power saving mode and is out of the normal current supplying mode, the management information is updated in response to the inquiry about the management information.

The second embodiment of the invention will now be described. Explanation of component elements having the same construction and the same operations as those in the first embodiment is omitted.

Figure 11:
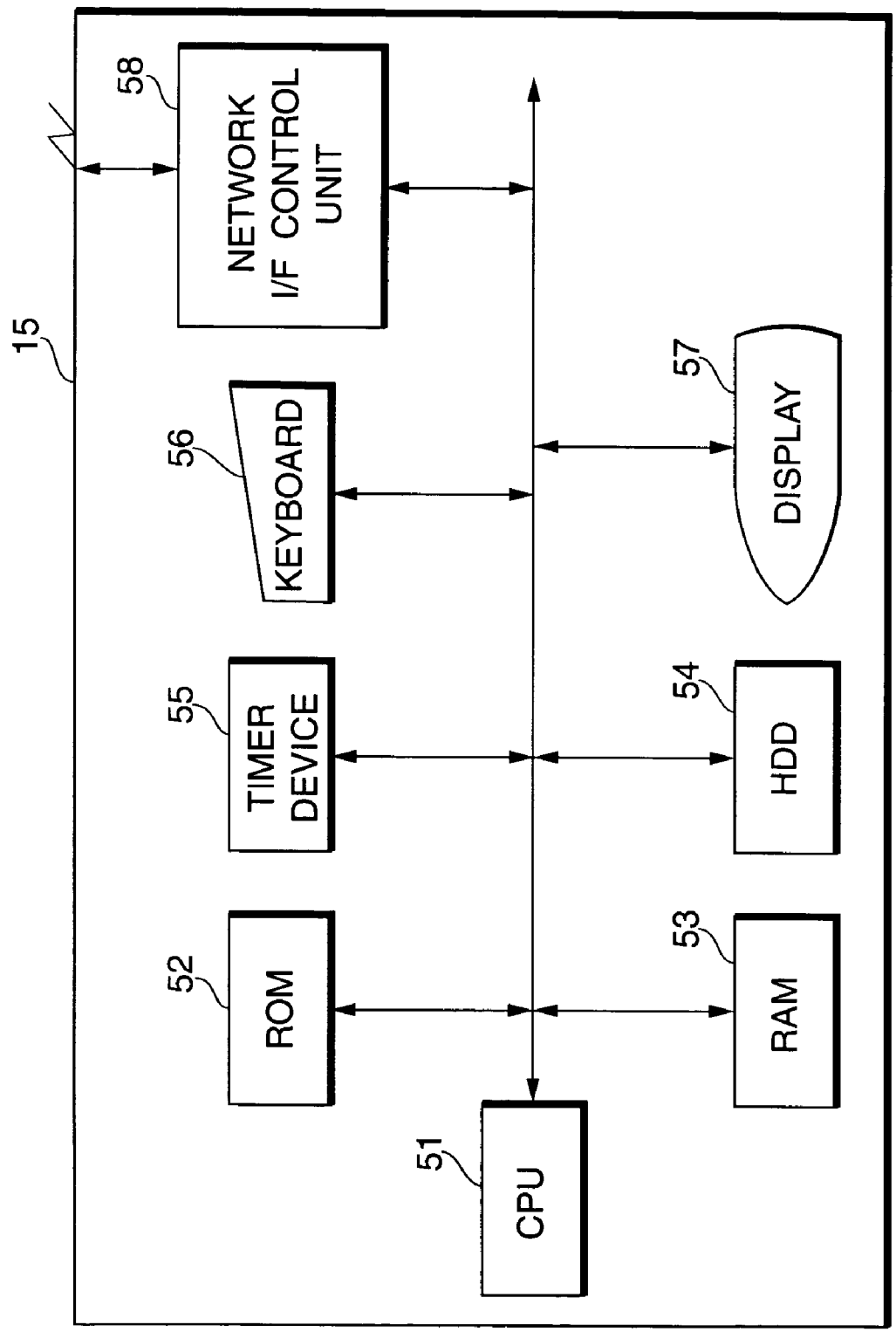
FIG. 11 is a diagram showing a construction of a server for an administrator in the second embodiment of the invention.
Figure 12:
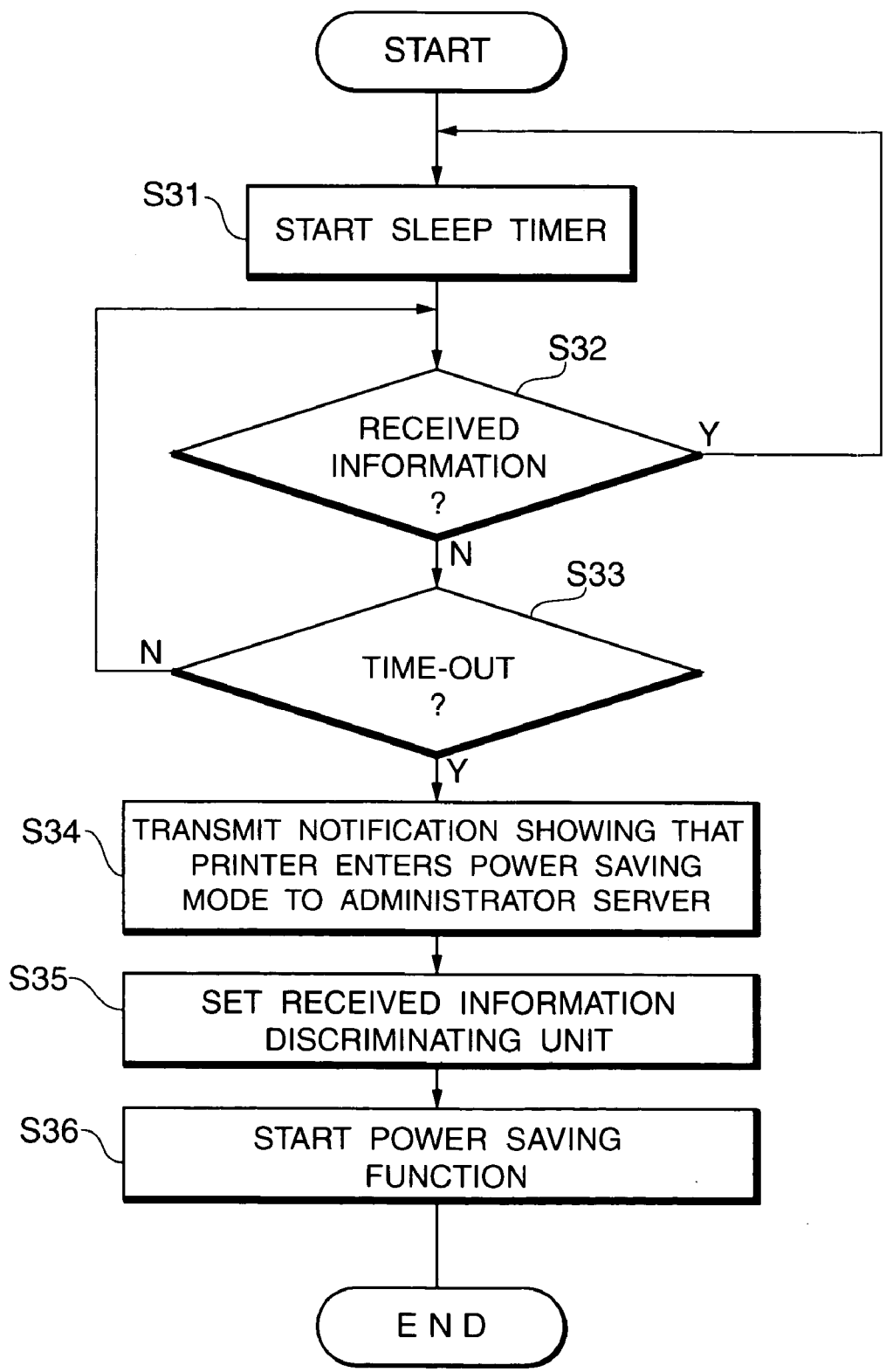
FIG. 12 is a flowchart showing the operation of a printer in the second embodiment of the invention.

FIG. 11 is a diagram showing a construction of the administrator server in the second embodiment of the invention. FIG. 12 is a flowchart showing the operation of the printer in the second embodiment of the invention.

In the second embodiment, as shown in FIG. 11, the administrator server 15 comprises: a CPU 51 as arithmetic operating means; a ROM 52, a RAM 53, and an HDD (Hard Disk Drive) 54 as storing means; a timer device 55; a keyboard 56 as input means; a display 57 as display means; and a network I/F control unit 58 as a communication control unit. The CPU 51, ROM 52, RAM 53, HDD 54, timer device 55, keyboard 56, display 57, and network I/F control unit 58 are mutually connected via a bus.

The operation of the printer management system 10 in the embodiment will now be described.

First, the print data is transmitted from the user terminal 11 to the printer 14 via the network 12. The print data transmitted to the printer 14 is sent to the control unit 21 via the network I/F control unit 23, interpreted by the control unit 21, and developed into image information. Subsequently, the control unit 21 controls the operation of the image forming means 20 so as to print onto the print sheet on the basis of the developed image information. The control unit 21 stores the management information such as the number of print sheets consumed for the printing, kind of sheet, amount of toner used, and the like into the non-volatile memory 22.

In the case of collating the management information, an inquiry request to collate the management information is transmitted to the printer 14 via the network 12. The inquiry request transmitted to the printer 14 is sent to the control unit 21 via the network I/F control unit 23. Subsequently, the control unit 21 reads out the management information stored in the non-volatile memory 22 in response to the inquiry request and transmits it to the network I/F control unit 23. The network I/F control unit 23 returns the management information to the administrator server 15 via the network 12. The collation of the management information is periodically made.

The operation of the printer management system 10 in the power saving mode will now be explained.

First, the main switch of the printer 14 is turned on and when a predetermined time passes in a state where the power sources are supplied from the power unit 26 to the power shut-off area under power saving 24 and the normally-open current supplying area 25, the signal is sent from the timer 18 to the control unit 21. In response to this signal, the control unit 21 notifies the administrator server 15 that the printer enters the power saving mode. Subsequently, the control unit 21 generates the power saving operating command to the power unit 26. Thus, the power unit 26 shuts off the power source of the power shut-off area under power saving 24 and the printer 14 enters the power saving mode. After the administrator server 15 receives the notification showing that the printer enters the power saving mode, the periodic inquiry about the management information is stopped.

The case of reactivating the printer 14 will now be described. In this case, when the print data is transmitted to the printer 14 from the user terminal 11 via the network 12, the received information discriminating unit 30 in the network I/F control unit 23 discriminates the received information. Whether the received information is the print data or not is not discriminated here but the power-saving operation cancelling command is issued to the power unit 26. Thus, the power unit 26 supplies the power source of the power shut-off area under power saving 24 and the printer 14 enters the normal operating mode. Similarly, the printer 14 also enters the normal operating mode by the key operation from the operation unit 19.

The operation of the printer 14 at the start of the power saving will now be described in detail with reference to the flowchart of FIG. 12.

Step S31: The control unit 21 starts the timer 18.

Step S32: The control unit 21 discriminates the presence or absence of the received information. If the received information exists, the processing routine is returned to step S31. If there is no received information, step S33 follows.

Step S33: The control unit 21 discriminates whether a time-out has occurred or not, that is, whether the count value of the timer 18 exceeds the preset value or not. If it exceeds the preset value, step S34 follows. If it does not exceed the preset value, the processing routine is returned to step S32.

Step S34: The control unit 21 notifies the administrator server 15 from the network I/F control unit 23 via the network 12 that the printer enters the power saving mode.

Step S35: Since it is determined that the time-out has occurred, the control unit 21 writes the pattern for discriminating the print data into the received information discriminating unit 30. If the received information discriminating unit 30 of the network I/F control unit 23 recognizes the print data, the control unit 21 sets the register built in the I/F unit 27 so as to generate the power-saving operation cancelling command.

Step S36: The control unit 21 issues the instruction to the power unit 26 so as to shut off the power source of the power shut-off area under power saving 24. After that, the control unit 21 stops the operation.

The operation to cancel the power saving function will now be explained.

Figure 13:
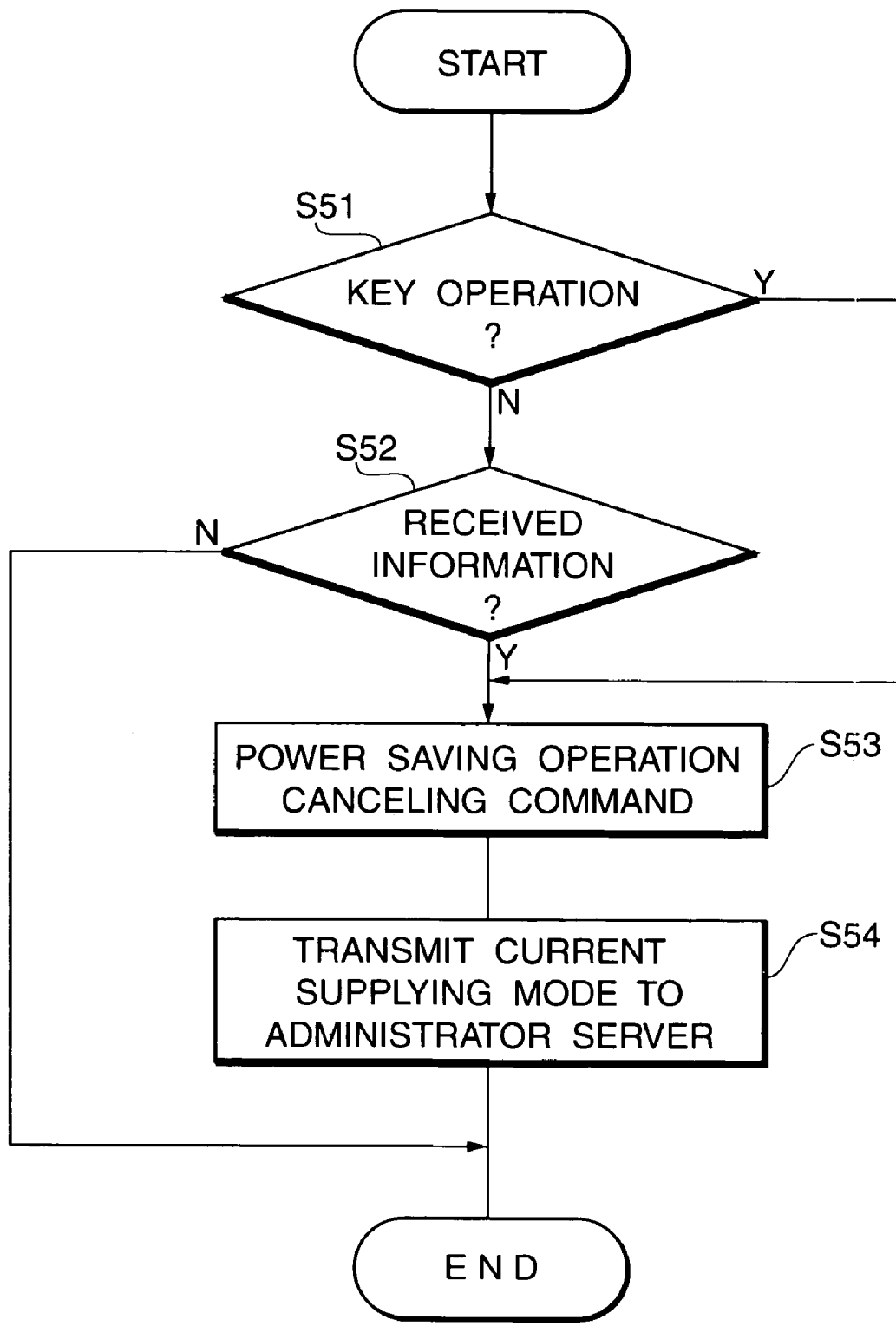
FIG. 13 is a flowchart showing the operation for cancelling a power saving function of the printer in the second embodiment of the invention.

FIG. 13 is a flowchart showing the operation for cancelling the power saving function of the printer in the second embodiment of the invention.

The operation of the received information discriminating unit 30 of the printer 14 in the case of cancelling the power saving function will now be described in detail with reference to the flowchart of FIG. 13.

Step S51: The operation unit 19 discriminates whether there is a key operation or not. If there is the key operation, step S53 follows and the power-saving operation cancelling command is generated.

Step S52: The received information discriminating unit 30 discriminates the presence or absence of the received information. If the received information exists, step S53 follows. If there is no received information, the processing routine is finished.

Step S53: The received information discriminating unit 30 generates the power-saving operation cancelling command and step S54 follows.

Step S54: The control unit 21 notifies the administrator server 15 from the network I/F control unit 23 via the network 12 that the power saving mode is cancelled and the current is supplied.

The operation of the administrator server 15 will now be described.

Figure 14:
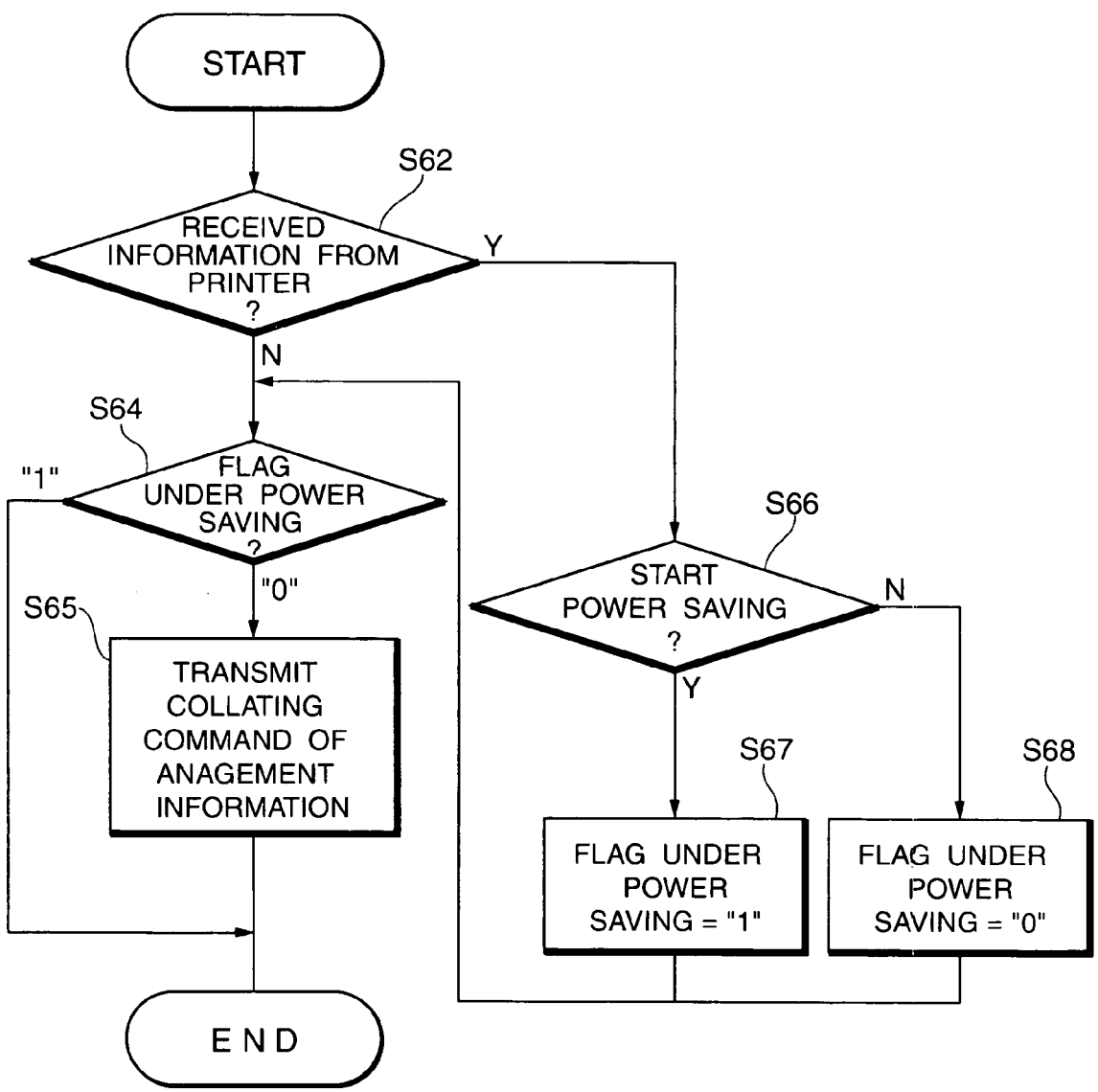
FIG. 14 is a flowchart showing the operation of the server for the administrator in the second embodiment of the invention.

FIG. 14 is a flowchart showing the operation of the administrator server in the second embodiment of the invention.

In the printer 14, in the case of inputting the ID information of the administrator server 15, the user operates the keys of the operation unit 19 and inputs the ID information of the administrator server 15, so that the ID information is stored into the non-volatile memory 22.

In the administrator server 15, the CPU 51 executes an OS (Operating System) or a managing program stored in the HDD 54 and temporarily stores information necessary for executing the program into the RAM 53. A basic I/O program and the like are stored into the ROM 52. The RAM 53 functions as a main memory, a work area, or the like of the CPU 51. Further, the network I/F control unit 58 temporarily stores data at the time of accessing the network 12 and modulates/demodulates the signal. The timer device 55 functions as a monitoring timer. The managing program periodically inquires of the printer 14 about the management information. The kind and the number of sheets used by the printer 14, the ID information of the user terminal 11, and the like are included in the management information. By summing the management information, a use situation of the printer 14 can be formed.

The operation in the case of inquiring of the printer 14 about the management information by the managing program will be described in detail with reference to the flowchart of FIG. 14. The managing program executes the operation at a predetermined period.

Step S62: The CPU 51 discriminates whether the received information from the printer 14 exists or not. If the received information exists, step S66 follows. If there is no received information, step S64 follows.

Step S64: The CPU 51 discriminates whether a flag indicating that the printer is in the power saving mode is equal to "1"=(under the power saving) or "0"=(normal operation). If it is equal to "0", step S65 follows. If it is equal to "1", the processing routine is returned to step S61.

Step S65: The CPU 51 transmits the command for collating the management information to the printer 14.

Step S66: The CPU 51 discriminates whether the received information is the notification to start the power saving or not. If it is the notification to start the power saving, step S67 follows. If it is not the notification to start the power saving, step S68 follows.

Step S67: The CPU 51 sets the flag showing that the printer is in the power saving mode to "1"=(under the power saving). Step S64 follows.

Step S68: The CPU 51 sets the flag showing that the printer is in the power saving mode to "0"=(normal operation). Step S64 follows.

As mentioned above, in the embodiment, the printer 14 transmits the notification showing that the printer enters the power saving mode and the notification showing that the power saving mode is cancelled to the administrator server 15. When the managing program of the administrator server 15 receives the notification showing that the printer 14 has entered the power saving mode, the collation of the management information which is periodically made is stopped until the printer 14 receives the notification showing that the power saving mode has been cancelled.

Thus, even in the case where there is no peculiar information for identifying the print data and it is difficult to distinguish the inquiry about the management information from the print data, the wasteful operation such that the management information which is not changed because the printer is in the power saving mode is periodically referred to can be omitted. The amount of the electric power consumption when the printer 14 is in the standby mode can be suppressed.

The third embodiment of the invention will now be described. Explanation of component elements having the same construction and the same operations as those in the first and second embodiments is omitted.

Figure 15:
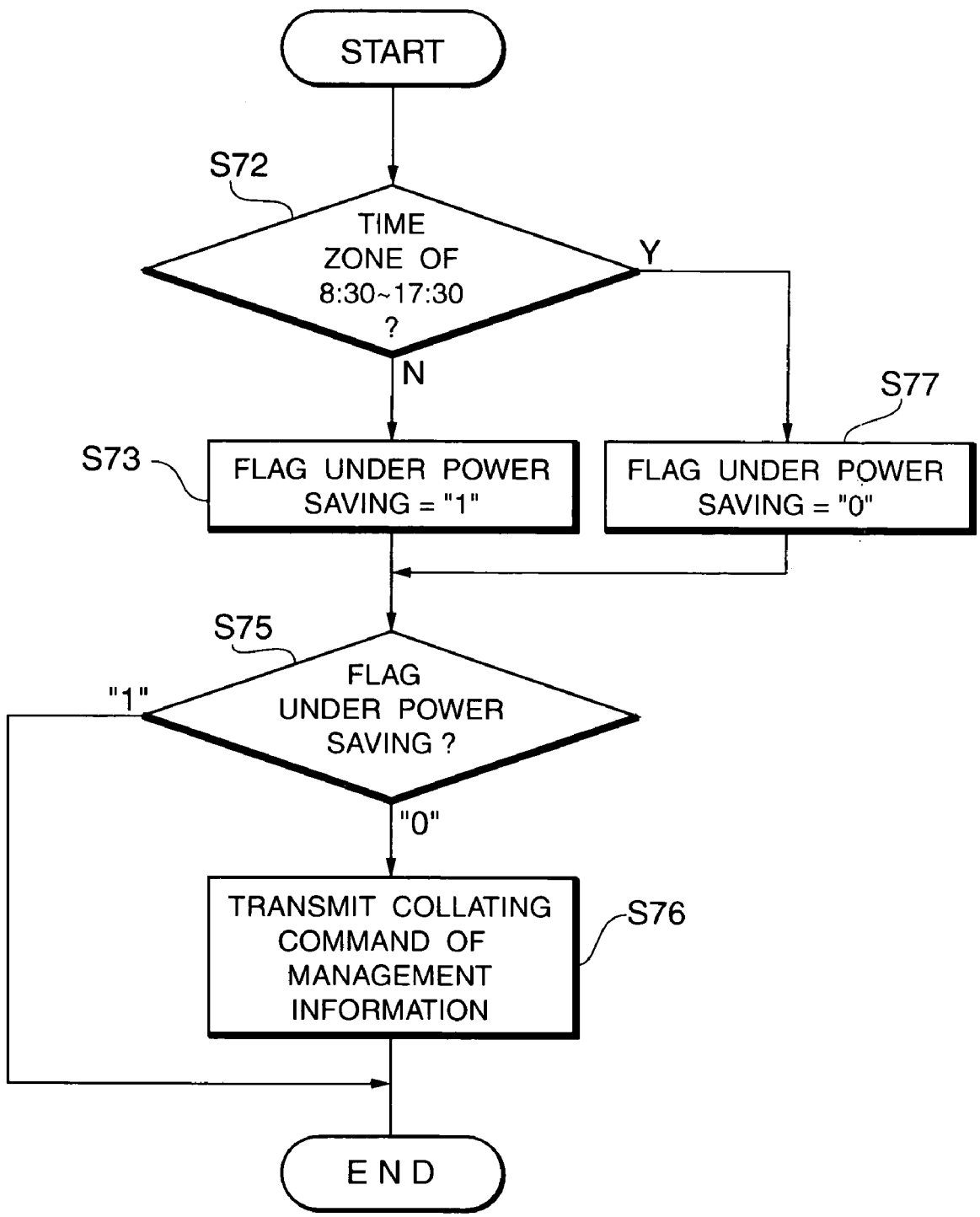
FIG. 15 is a flowchart showing the operation of a server for an administrator in the third embodiment of the invention.

FIG. 15 is a flowchart showing the operation of the administrator server in the third embodiment of the invention.

In the third embodiment, the printer 14 has substantially the same construction as those of the first and second embodiments, has a function for shutting off/recovering a part or all of the power sources, has a function for making communication via the network 12, and has a function for responding to the collation of the management information. The administrator server 15 has substantially the same construction as that of the second embodiment.

First, the print data is transmitted from the user terminal 11 to the printer 14 via the network 12. The print data transmitted to the printer 14 is sent to the control unit 21 via the network I/F control unit 23, interpreted by the control unit 21, and developed into image information. Subsequently, the control unit 21 controls the operation of the image forming means 20 on the basis of the developed image information so as to print onto the print sheet. The control unit 21 stores the management information such as the number of print sheets consumed for the printing, kind of sheet, amount of toner used, and the like into the non-volatile memory 22.

In the case of collating the management information, the inquiry request to collate the management information is transmitted to the printer 14 via the network 12. The inquiry request transmitted to the printer 14 is sent to the control unit 21 via the network I/F control unit 23. Subsequently, the control unit 21 reads out the management information stored in the non-volatile memory 22 in response to the inquiry request and transmits it to the network I/F control unit 23. The network I/F control unit 23 returns the management information to the administrator server 15 via the network 12.

Although the collation of the management information is periodically made, the number of times of collation of the management information can be reduced in accordance with the time. For example, if a time zone from 8:30 in the morning to 17:30 in the evening as an ordinary working time zone is set to a time zone in which the collation of the management information is periodically made, the collation of the management information is made in the ordinary working time zone in which use frequency of the printer 14 is considered to be high and the collation of the management information is not made in another time zone in which the use frequency of the printer 14 is considered to be low. Thus, the printer 14 can be left in the power saving mode in the time zone in which the use frequency of the printer 14 is low and a possibility that the printer has entered the power saving mode is high.

The operation of the managing program will now be explained in detail with reference to the flowchart of FIG. 15. The managing program periodically executes the operation.

Step S72: The CPU 51 discriminates the time when the timer device 55 outputs the count value and discriminates whether the time lies within the time zone from 8:30 to 17:30 or not. If it does not lie within such a time zone, it is determined that the use frequency of the printer 14 is low. Step S73 follows. If it lies within such a time zone, step S77 follows.

Step S73: The CPU 51 sets the flag showing that the printer is in the power saving mode to "1"=(under the power saving).

Step S75: The CPU 51 discriminates whether the flag showing that the printer is in the power saving mode is equal to "1"=(under the power saving) or "0"=(normal operation). Step S64 follows. If it is equal to "0", step S76 follows. If it is equal to "1", the processing routine is finished.

Step S76: The CPU 51 transmits the command for collating the management information to the printer 14.

Step S77: The sets the flag showing that the printer is in the power saving mode to "0"=(normal operation) and step S74 follows.

As mentioned above, in the embodiment, the means for reducing the frequency of the collation of the management information in accordance with the time is added to the managing program of the administrator server 15.

Thus, even if the printer 14 does not have the means which does not respond to the inquiry about the management information or the means for suppressing the inquiry about the management information, the wasteful operation such that the management information which is not changed because the printer is in the power saving mode is periodically referred to can be omitted. The amount of the electric power consumption when the printer 14 is in the standby mode can be suppressed.

In the first and second embodiments, even when a facsimile apparatus, a copying apparatus, a hybrid apparatus, or the like is used as an image forming apparatus in place of the printer 14, similar effects can be obtained. It is also possible to change the control contents to contents such that the printer 14 in the first embodiment is activated only when the management information is changed by changing the setting of the received information discriminating unit 30 in accordance with conditions, and when the management information is not changed, the power saving mode is held without making a response. Further, in the third embodiment, although the time zone of the low use frequency has been set to the time zone from 17:30 in the evening to 8:30 in the morning, the time zone of the low use frequency can be properly changed in accordance with the use form of the printer 14.

The invention is not limited to the foregoing embodiments but many modifications and variations are possible on the basis of the spirit of the invention and they are not excluded from the scope of the invention.

As described in detail above, according to the invention, the image forming apparatus comprises: the communication control unit which receives the print data and the management information obtaining command from the outside; the data discriminating unit which discriminates the print data and the management information obtaining command received by the communication control unit and notifies the communication control unit of the discrimination result; the image forming unit which receives the print data from the communication control unit and prints on the basis of the print data; and the power supply control unit which shuts off/recovers a part or all of the power sources which are supplied to the image forming unit and transmits the notification showing that the shut-off/recovery has been made to the communication control unit, wherein when the communication control unit receives the notification showing that the data discriminating unit has determined that the received information is the management information obtaining command, if a part or all of the power sources which are supplied to the image forming unit have been shut off, the communication control unit maintains the shut-off state of the power supply control unit.

What is claimed is:

1. An image forming system comprising:
    an image forming apparatus;
    at least one user terminal; and
    a management information server which obtains management information showing a state of said image forming apparatus by a management information obtaining command to said image forming apparatus,
    wherein said image forming apparatus comprises:
    a communication controlling section to receive print data from said user terminal and receives a management information obtaining command from said management information server as received information;
    an image forming section to perform a print on the basis of said print data; and
    a power source controlling section to at least supply a power source to said image forming section and to control said power source in either of a power saving mode and a normal current supplying mode, wherein when said power source is changed from said normal current supplying mode to said power saving mode, said communication controlling section sends a notification to said management information server in order to notify said management information server to stop sending said management information obtaining command.

2. The image forming system according to claim 1, wherein the power source controlling section transmits a notification showing that a power saving/recovery of the power source has been made to said communication control unit and said communication control unit transmits contents of said notification to said management information server, and said management information server does not transmit a new management information obtaining command to said image forming apparatus when said management information server receives the notification showing that the power sources which are supplied to said image forming unit of said image forming apparatus are in the power saving mode, and restarts the transmission of said management information obtaining command to said image forming apparatus when said management information server receives the notification showing that the power sources which are supplied to said image forming unit have recovered from the power saving mode.

3. The image forming system according to claim 1, wherein the power source controlling section transmits a notification showing that a power saving/recovery of the power source has been made to said communication control unit and said communication control unit transmits contents of said notification to said management information server, and said management information server increases the transmission/reception frequency of said management information obtaining command to said image forming apparatus when said management information server receives the notification showing that the power sources which are supplied to said image forming unit have recovered from the power saving mode.

4. The system of claim 1, wherein said image forming apparatus further comprises an information storing section to store management information relating to said print, when said power source is changed from said power saving mode to said normal current supplying mode, said power supply controlling section sends a notification to said management information server in order to allow said management information server to send said management information obtaining command, said communication controlling section sends said management information stored in said information storing section to said management information server in order to reply to said management information obtaining command.

5. The system of claim 1, wherein said image forming apparatus further comprises a data discriminating section, when said power source is in said normal current supplying mode, said data discriminating section discriminates whether said received information is said print data or is said management information obtaining command, if said received information is discriminated being said management information obtaining command, said communication controlling section sends said management information stored in said information storing section to said management information server in order to reply to said management information obtaining command.

6. The system of claim 1, wherein when said print data is received by said communication controlling section, said power source controlling section controls said power source to be in said normal current supplying mode.

7. The system of claim 1, wherein said management information contains a use quantity of consumption supplies.

8. The system of claim 1, wherein when said communication controlling section does not receive information for a predetermined time, said power source controlling section controls said power source to be in said power saving mode.

9. The system of claim 1, wherein said image forming apparatus further includes an operating section, and said power source controlling section controls said power source to be in said normal current supplying mode according to an output of said operating section.

* * * * *